Patented Apr. 25, 1939

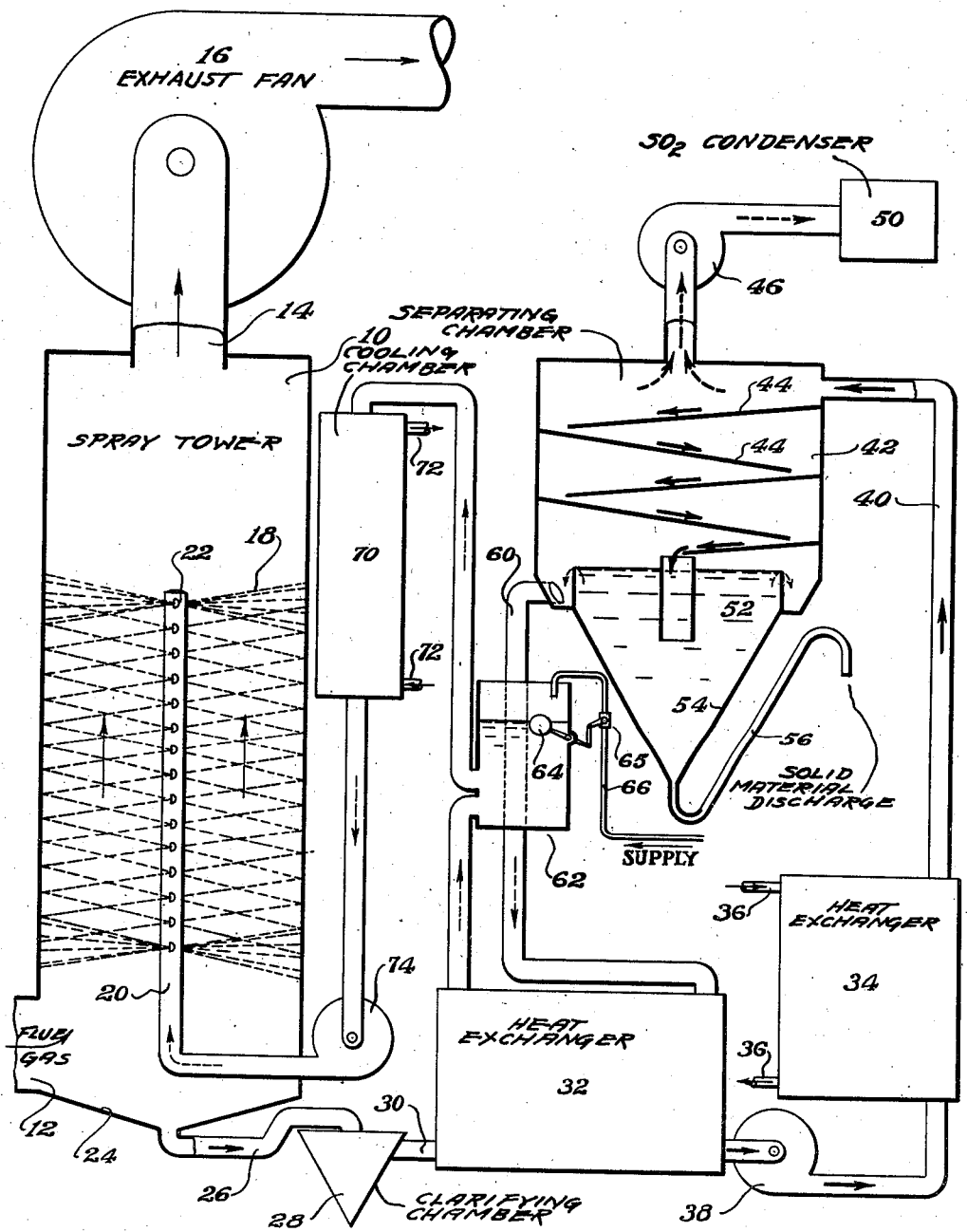

2,155,853

UNITED STATES PATENT OFFICE 2,155,853

METHOD OF PURIFYING FLUE GASES

Alfred W. Anthony, Jr., Belmont, Mass., assignor to Pease, Anthony Equipment Company, Cambridge, Mass., a corporation of Massachusetts Application March 29, 1937, Serial No. 133,502

4 Claims. (Cl. 23—2)

The present invention relates to a method and apparatus particularly adapted for the treatment of flue gases and the like, but also generally applicable to any gases which contain not only solid materials in suspension, but in addition certain soluble or chemically reactive gases, which may be desirably removed, either because of their injurious effects if allowed to escape into the air, or because of their commercial value if susceptible of recovery.

The principal object of the present invention is the provision of a system for the washing and scrubbing of gases which shall not only remove solid ingredients contained therein, but which will also remove soluble and chemically reactive noxious gases.

A secondary object is to provide a means for obtaining substantially pure sulphur dioxide and carbon dioxide from combustion gases and for recovering commercially valuable gases as well as fumes from smelting operations.

With this and similar objects in view, the invention is concerned with a cyclical process which proposes to scrub gases with any suitable solution in a manner to wash and collect solid material in suspension in the gases and carry into solution certain associated gases such as $SO_2$ gas which may be dissolved in the washing fluid. By a suitable control of the temperature and pressure of the washing or scrubbing operation and of the washing fluid at other points in the system, it can be rendered capable of absorbing substantial percentages of certain gases in the washing operation and liberating these gases subsequently through an elevation of temperature, which may be accompanied by a reduction of pressure, for the purpose of regenerating the washing fluid, separating the gases in a form suitable for commercial use, and removing and collecting solid material from the washing fluid.

According to the present invention the method is carried out as a cyclical operation with the fluid passed successively through a spray washer or scrubber for the purpose of removing solid material and heavy gases from the flue gases or the like under treatment, thereafter raised to a temperature which will permit liberation of the soluble gases and the removal and collection of solid material while maintained at such a temperature, and subsequently cooling the washing fluid after removal and returning it to the spray washer or scrubber with the necessary amount of fresh liquid to maintain substantially constant volume and concentration of washing fluid in the system. For the economical functioning of this process the absorption should take place at the lowest possible temperature, and the regeneration or removal of gases should take place at the highest possible temperature and preferably the lowest possible pressure.

It may under certain circumstances be desirable to remove a portion of the solid material to partially clarify the fluid before elevation of temperature or to repeat the operation under modified conditions of temperature and pressure for the purpose of removing impurities from the liberated gases or for other reasons.

As an example of one important application of this process, it will be described with reference to its application to the removal of solid materials and of $SO_2$ gas from flue gases such as are obtained when sulphur bearing coals are burned in boiler furnaces.

I have found that the recirculating system disclosed and claimed in my Patent No. 1,986,913, dated January 8, 1935, is well adapted for the attainment of my purpose and the carrying out of my new process. In this apparatus the escaping flue gases are scrubbed or washed in a spray tower, the dirty wash water is first delivered to a clarifying chamber from which a portion of the solid material is separated and removed in the form of a wet sludge or the like. The remaining and partially clarified wash water is conveyed to a skimming chamber where additional material may be skimmed from the surface if desired, and fresh water added to the system in variable amounts controlled by the water being constantly removed. Thereafter the wash water is returned by a circulating pump to the spray tower, and it is available for reuse.

The employment of a scrubber of the type illustrated in my earlier patent provides an efficient contact of washing fluid with the dusty gas to accomplish complete removal of solid material and subsequent regeneration of the fluid and removal of the solid material outside of the scrubber. From the standpoint of regeneration of the fluid together with removal of solid material, the present process has demonstrated marked efficiency, as the elevation of the temperature of the fluid for the purpose of liberating gas aids markedly in the removal of finely divided solid material which is otherwise difficult of separation. This is entirely due to certain phenomena which accompany the elevation of temperature. At this elevated temperature settling of the solid material takes place much more rapidly than otherwise, due to the lessened viscosity of the water as the temperature is raised. In the second place, by providing for a simultaneous liberation of gas and removal of solids there is a tendency for the solids to act as nuclei for the liberation of the gas, and conversely the actual gas liberation promotes a tendency to froth and coagulate solids. For these reasons the liberation of the gases and separation of the solid material simultaneously at an elevated temperature complement one another and accomplish a markedly improved result from the point of view of separation of finer portions of the dust, this in spite of the fact that it may be desirable to collect certain portions of the coarser material before entering the heat exchangers, thus avoiding settling and abrasion therein. Nevertheless it is a fact that the major problem in dust separation is the removal of the finer particles of dust from the scrubbing field, and this separation is materially promoted when combined with the separation of gas at the elevated temperature.

The accompanying drawing illustrates diagrammatically a system designed and adapted for the carrying out of my new method as applied to flue gases, this system in its essential aspects being similar to the system disclosed in the patent referred to.

Referring more particularly to the illustrated embodiment of the invention, the spray tower is indicated generally at 10, and is provided with tangential inlet 12 for flue gas at the bottom portion and a central outlet 14 at the top portion. An exhaust fan indicated at 16 may serve to deliver the washed flue gases directly to a suitable stack. The upwardly spiraling dusty flue gas to be treated is caused to pass through a series of radiating sprays 18 delivered from a centrally arranged vertical standpipe 20 having a series of nozzles 22 mounted thereon. This arrangement compels the rotating gas body to be intercepted by and contact with a multiplicity of radiating sprays which wet down solid material and deliver it centrifugally to the walls of the chamber from which it washes by gravity to the bottom 24. The alkaline washing fluid is designed to dissolve $SO_2$ present in the gas, and to carry down in suspension the solid ash entrained in the gas; on settling, the ash will deposit as a sludge, but the dissolved $SO_2$ will remain uniformly distributed through the entire washing fluid.

In actual practice it has been found that the use of an ammonium salt solution, as for example, an ammonium salt of a weak acid such as carbonate or sulphite, at a temperature of about 100° F. is well adapted for dissolving of $SO_2$ gas, and is sufficiently alkaline at these temperatures. Other alkaline solutions such as sodium salts or conceivably some of the weak organic alkalies such as tri-ethanolamine may likewise be employed.

From the washing or scrubbing chamber the alkaline fluid is delivered to suitable means for elevating the temperature which likewise raises the vapor pressure of the contained soluble gases. This may conveniently take the form of one or more heat exchangers by virtue of which the temperature is elevated to the desired point, which may be shortly below boiling or a temperature range of about 180° F. to 200° F. In the illustrated embodiment of the invention the temperature is elevated through the employment of two heat exchangers, one of which secures its heat from washing fluid after soluble gases have been removed, and the second and final heat exchanger employing an external source of heat such as steam. Prior to the elevation in temperature, the washing fluid may, if so desired, be preliminarily and partially clarified of solid ingredients, or this may take place entirely at a time coincident with the removal of soluble gases, or subsequently thereto while the temperature remains elevated.

Actually, as indicated in the drawing, the fluid solution is first conveyed by gravity through a pipe 26 to a clarifying chamber indicated diagrammatically at 28. From this chamber the fluid is delivered by a pipe 30 to a heat exchanger indicated diagrammatically at 32. This heat exchanger may be of the tubular type in which the two fluids are not allowed to intermingle. From the first heat exchanger the partially heated fluid is delivered to a second heat exchanger 34, which may be heated by external means such as steam, the connections for which are indicated at 36. A pump 38 is indicated for maintaining the circulation of the fluid.

From the second heat exchanger the washing fluid with the temperature elevated to the desired point is delivered through a conduit 40 to a separating chamber 42. As indicated, in this separating chamber the gases, due to their increased vapor pressure, are caused to escape and are separately collected. For the purpose of improving the liberation of gas, it is desirable to have as large a liquid surface exposed as possible, and for this purpose the hot fluid entering the chamber 42 is caused to flow in sheets over baffles 44. The interior of the chamber is preferably in communication at its upper portion with an exhaust fan or pump 46, which may maintain a vacuum over the surface of the fluid, and which serves to aid in drawing off liberated gases, and also to discharge them under pressure if desired. From the pump these gases may be passed to a condenser indicated at 50, and thereafter collected in any desired manner; said condenser 50 may be operated at elevated pressures to condense liquids, like $SO_2$, whose condensation at ordinary pressures is impossible with ordinary cooling water.

A substantial volume of soluble $SO_2$ gas having been liberated, the fluid is delivered to a central chamber 52 having conical walls 54 to permit the settling of solid material and a separate delivery at 56. The regenerated fluid is then delivered through a conduit 60 to the heat exchanger 32, and caused to impart heat to the incoming fluid. Thereafter this fluid is delivered to a chamber 62 with a constant level controlled by a float 64, which in turn operates a valve 65 in a supply line 66, through which fresh alkaline fluid is caused to enter the chamber.

Following the first lowering of temperature in the heat exchanger 32, the regenerated fluid may be further lowered by passing through an exchanger 70, which is cooled by external means such as cold water admitted and delivered at 72. Thus cooled to the proper temperature, relatively cold and regenerated fluid may be delivered to the spray tower by the pump 74.

Obviously, the chamber 62, which serves for automatic replenishment of the supply, may be changed in its location without altering the scope of the invention; as, for example, this fluid may be added to the system after final cooling of the regenerated fluid in the heat exchanger 70.

It will be evident that the accompanying drawing is purely diagrammatic, and that the various sizes of the parts shown therein have no significance. Furthermore, the arrangement of the parts does not indicate, nor is it intended to indicate, the relative heights or positions with respect to one another, but merely groups the various elements of the system in their proper sequence, without regard to whether the liquid flows from one element to another by forced circulation or gravity.

It will be evident from the foregoing that not only is the present method well adapted for the scrubbing of flue gases because of its substantially complete removal from the gases of not only solid materials but certain injurious gases such as $SO_2$, but in addition the employment of an alkaline washing fluid for this purpose avoids the injurious effects of an acid solution which may be violently corrosive of ducts, piping and any metal parts of the system.

Although the present invention has been described in connection with the liberation of $SO_2$ gas through the elevation of temperature of the washing fluid, increasing the vapor pressure of the gas sufficiently to cause liberation, it will likewise be understood that lowering of the external pressure to which the fluid is subjected, and in consequence increasing the pressure differential aids in the liberation of gas.

It will be evident from the foregoing description that the removal of the finer solid materials takes place much more readily at an elevated temperature, and is therefore carried out most economically either simultaneously with or immediately before or after the gas liberation step and while the temperature is maintained at an elevated point. This has been found entirely feasible particularly if the coarser solids are removed from the fluid before passage through the heat exchangers.

What is claimed is:

1. The method of treating flue gases containing solid materials and soluble or chemically reactive gases in suspension, which consists in scrubbing and washing the gas to be treated through intimate surface contact with an alkaline washing fluid capable of dissolving the soluble gases and of wetting down and removing solid materials, thereafter substantially elevating the temperature of the washing fluid with contained solids and dissolved gases to not less than 180° F., approximately, liberating and removing from the fluid a percentage of the gases at the elevated temperature, and while the temperature is still elevated separating from the fluid entrained solid materials.

2. The method of treating flue gases containing solid materials and soluble or chemically reactive gases in suspension, which consists in scrubbing and washing the gas to be treated through intimate surface contact with an alkaline washing fluid capable of dissolving the soluble gases and of wetting down and removing solid materials, thereafter substantially elevating the temperature of the washing fluid with contained solids and dissolved gases to not less than 180° F., approximately, liberating and removing from the fluid a percentage of the gases at the elevated temperature, separating from the fluid at the elevated temperature entrained solid materials, and after regeneration of the fluid depressing the temperature and delivering the said fluid for reuse in an alkaline condition to the washing chamber.

3. The method of treating flue gases containing solid materials and soluble or chemically reactive gases in suspension, which consists in scrubbing and washing the gas to be treated through intimate surface contact with an alkaline washing fluid capable of dissolving the soluble gases and of wetting down and removing solid materials, removing coarse solids to partially clarify the fluid, thereafter substantially elevating the temperature of the washing fluid with contained solids and dissolved gases to not less than 180° F., approximately, liberating and removing from the fluid a percentage of the gases at the elevated temperature, and while the temperature is maintained elevated separating from the fluid entrained solid materials.

4. The method of washing dusty flue gases which consists in bringing the flue gas to be treated into intimate surface contact with an alkaline washing fluid capable of dissolving the oxides of sulphur therein and of wetting down and removing solid materials in a spray chamber, thereafter substantially elevating the temperature of the fluid with contained solids and dissolved sulphur dioxide to not less than 180° F., approximately, and while the temperature is so maintained liberating and removing from the fluid a percentage of the sulphur dioxide and separating from the fluid entrained solid materials both at the elevated temperature.

ALFRED W. ANTHONY, Jr.